United States Patent [19]
Elonen

[11] 3,910,132
[45] Oct. 7, 1975

[54] TANDEM DRIVE SHAFT ARRANGEMENT
[75] Inventor: Kunto Elonen, Tampere, Finland
[73] Assignee: Rauma-Repola Oy., Tampere, Finland
[22] Filed: Apr. 16, 1974
[21] Appl. No.: 461,454

[30] Foreign Application Priority Data
Apr. 27, 1973 Finland .............................. 1351/73

[52] U.S. Cl. ............................ 74/384; 180/24.08
[51] Int. Cl.² ................ F16H 35/00; B26D 3/00; B26D 61/00
[58] Field of Search ............ 180/24.08, 24.05; 74/217 C, 321 R, 384

[56] References Cited
UNITED STATES PATENTS
1,577,779   3/1926   White .............................. 180/24.08
1,606,707  11/1926   Johnston et al. .................. 180/24.08

FOREIGN PATENTS OR APPLICATIONS
293,899   7/1928   United Kingdom .............. 180/24.05

Primary Examiner—Leonard H. Gerin
Attorney, Agent, or Firm—Burns, Doane, Swecker & Mathis

[57]   ABSTRACT

A tandem axel drive arrangement for a vehicle such as a truck wherein the driving torque is transmitted to the ground engaging wheels of both axles from a gear or chain wheel that is located between the tandem axles. The gear or chain wheel is driven by a pinion on a shaft that is movably mounted relative to the gear or chain wheel. The gear ratio between the gear or chain wheel and the ground engaging wheels must be 1:1.

3 Claims, 1 Drawing Figure

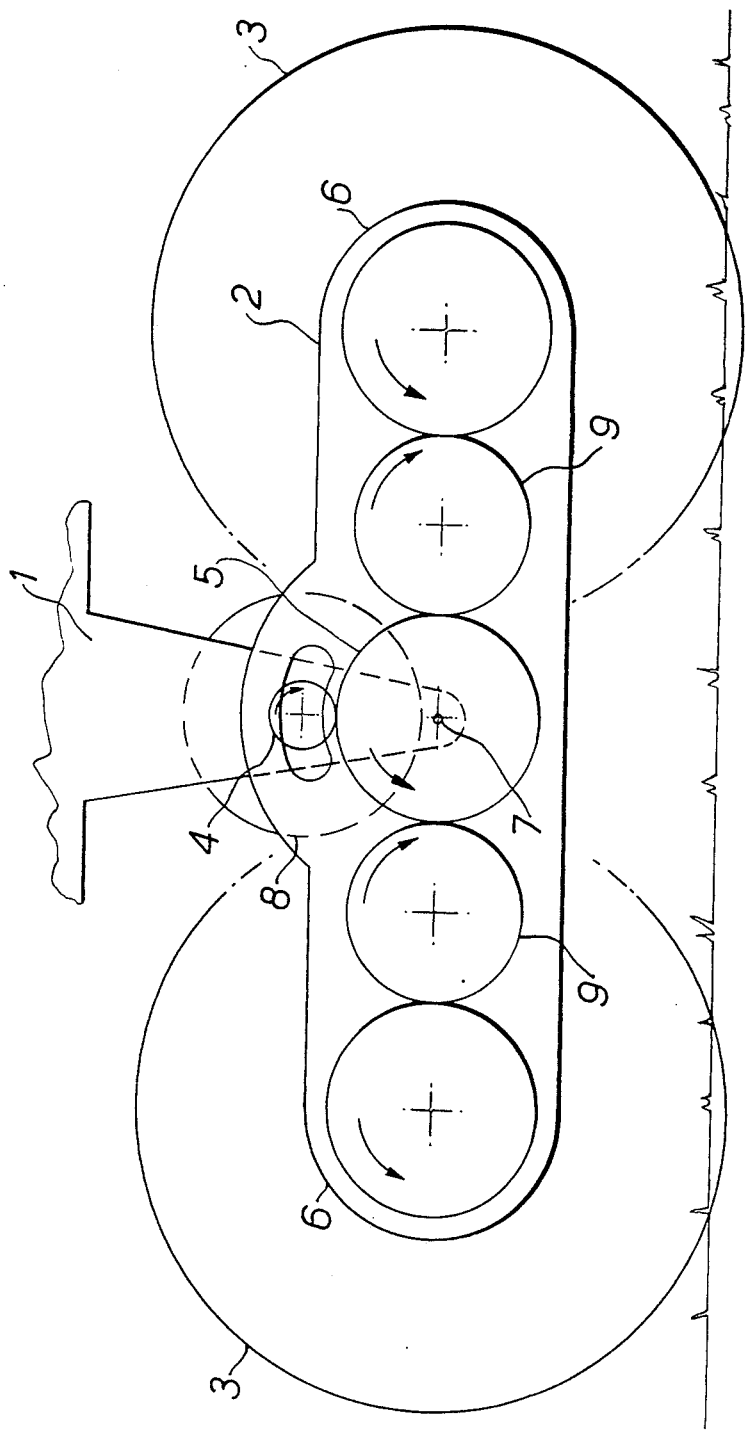

TANDEM DRIVE SHAFT ARRANGEMENT

This invention relates to a tandem drive shaft arrangement having transmission means, such as gear wheels, chains or the like inside a casing which is mounted at its centre to the frame of a machine or vehicle, the casing having a wheel at both ends. A tandem shaft arrangement is often used in heavily loaded vehicles moving in the terrain. The gear ratio of the transmission in the casing must be 1:1 in order to have equal driving capacity and loading for both wheels of the tandem arrangement in all situations. In the arrangements of prior art this has resulted in big and heavy transmission mechanisms.

The object of this invention is to achieve a lighter and simpler transmission mechanism and a tandem drive shaft arrangement according to the invention is mainly characterized in that a gear or chain wheel driving a gear or chain wheel in the middle and smaller than the said middle wheel is positioned above the middle gear or chain wheel in the casing so that the shaft driving the small gear or chain wheel is arranged movably in relation to the casing and so that the gear ratio between the outer gear or chain wheels can be kept at 1:1 or so close to this ratio that an impeding difference in the loading of the drive wheels will not rise.

When a tandem shaft arrangement is arranged according to this invention, the clearance to the earth below the transmission mechanism can be increased, and this is important especially in the machines and vehicles moving in the terrain.

The invention will be further described with reference to the accompanying drawing, in which a schematical side view of a tandem shaft arrangement according to the invention is shown.

The shaft arrangement in the embodiment shown in the drawing operates so that a gear wheel 5 drives gear wheels 6 by means of gear wheels 9. The gear wheel 5 is positioned in a casing 2 pivotally mounted to a frame 1 at point 7 in the middle. A wheel 3 is mounted to a common shaft with the gear wheel 6 at each end of the casing 2. The gear ratio between the wheels 5 and 6 mounted in the casing 2 must be 1:1 in order to have equal driving capacity and loading for both wheels 3 in all situations. The moment brought to the gear wheel 5 in the casing 2 must be equal to the total of the moments of the drive wheels 3 at the ends. Otherwise, the whole casing 2 tends to turn around its centre axle 7 as the required drive force increases. In other words, the load difference between the front and rear wheels 3 increases if the gear ratio between the wheels 5 and 6 is changed from the said ratio 1:1.

In the arrangement according to the invention, the changing of the gear ratio is accomplished so that the gear ratio between the wheels 5 and 6 mounted in the casing 2 is 1:1 or differing from that to such an axtent that a desired lifting effect is achieved on one wheel 3, and the actual transmission ratio in the casing 2 is obtained by driving the middle wheel 5 of the casing 2 by means of a wheel 4 mounted to the frame 1 and smaller than the middle wheel 5. The wheels 4 and 5 can be toothed gear wheels or the arrangement can be carried out by means of a chain transmission. A power transmission 8 drives the gear wheel 4 which drives the gear wheels 6 and further the wheels 3 by means of the gear wheel 5 and the gear wheels 9. With this kind of an arrangement, the power transmission 8 can be lighter and simpler. When the wheel 4 is positioned in the casing above the middle wheel 5, the clearance to the earth in the middle of the machine can be increased and this improves the movability of the machine or vehicle in the terrain.

Since the invention comtemplates the use of gears or chain wheels for the rotative driving members, other terminology than "gear wheels" or "gear or chain wheel" may be applied to these elements. Thus, 5 may be described as a central rotatable driving member, the members 6 as a rotatable driving means, the members 9 as rotatable coupling means, and the drive member 4 as a rotatable power transmitting member.

The invention is not restricted to the embodiment presented above, it can considerably vary in details within the scope of the claim.

I claim:

1. A tandem drive shaft arrangement including a transmission means comprising a casing pivotably mounted at its center to the frame of a vehicle, a pair of wheels each with a rotatable driving means coaxially secured thereto and supported at opposite ends of said casing in tandem relationship a central rotatable driving member supported on said casing in substantially axial alignment with the point about which said casing is pivotable, rotatable coupling means for transmitting rotation between said central rotatable driving member and each of said rotatable wheel driving members, and a rotatable power transmitting member of smaller operative diameter than said central rotatable driving member supported on said vehicle frame above said central rotatable driving member in driving arrangement therewith throughout the range of pivotable movement of said casing, the dimensions of said rotatable power transmitting member, said central rotatable driving member, said rotatable coupling means and said wheel driving means being so related as to maintain a substantially 1:1 driving range between said wheels throughout the range of pivotable movement of said casing.

2. A tandem drive shaft arrangement as recited in claim 1, wherein the axes of rotation said central rotatable driving member and the said rotatable driving means for both wheels are substantially aligned longitudinally of said casing and the axis of rotation of said rotatable power transmitting member is in substantial vertical alignment with the point about which said casing is pivotable.

3. A tandem drive shaft arrangement including a transmission means comprising a casing pivotably mounted at its center to the frame of a vehicle, a pair of wheels each with a driving gear coaxially secured thereto and supported at opposite ends of said casing in tandem relationship, a central driving gear supported on said casing in substantially axial alignment with the pivot point about which said casing is pivotable and with its axis of rotation in substantial alignment with the axis of rotation of said driving gears for said wheels longitudinally of said casing, idler gear means supported on said casing for transmitting rotation from said driving gear to each of said driving gears for said wheels at a substantially 1:1 driving ratio between said wheels, a power transmitting gear of smaller diameter than said driving gear supported on the frame of said vehicle with its axis of rotation in substantially vertical alignment with the point about which said casing is pivotable for driving said driving gear throughout the range of pivotable movement of said casing while maintaining the substantially 1:1 driving ratio between said wheels.

* * * * *